United States Patent
Lin

(10) Patent No.: US 6,346,933 B1
(45) Date of Patent: Feb. 12, 2002

(54) INTERACTIVE DISPLAY PRESENTATION SYSTEM

(75) Inventor: Shang-Hung Lin, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/399,933

(22) Filed: Sep. 21, 1999

(51) Int. Cl.$^7$ .................................................. G09G 5/08
(52) U.S. Cl. ..................... 345/157; 345/158; 353/42; 353/121; 348/744
(58) Field of Search ................................. 345/156, 157, 345/158, 163, 589, 169; 353/42, 43, 121, 122; 348/141, 744; 702/95; 382/225

(56) References Cited

U.S. PATENT DOCUMENTS

| | | |
|---|---|---|
| 4,280,135 A | 7/1981 | Schlossberg |
| 5,181,015 A | 1/1993 | Marshall et al. |
| 5,235,363 A | 8/1993 | Vogeley et al. |
| 5,422,693 A | 6/1995 | Vogeley et al. |
| 5,434,595 A | 7/1995 | Macaulay |
| 5,489,923 A | 2/1996 | Marshall et al. |
| 5,502,459 A | 3/1996 | Marshall et al. |
| 5,504,501 A | 4/1996 | Hauck et al. |
| 5,515,079 A | 5/1996 | Hauck |
| 5,528,263 A | 6/1996 | Platzker et al. |
| 5,584,552 A | 12/1996 | Nam-Su et al. |
| 5,594,468 A | 1/1997 | Marshall et al. |
| 5,661,667 A | 8/1997 | Rueb et al. |
| 5,663,795 A | 9/1997 | Rueb |
| 5,682,181 A | 10/1997 | Nguyen et al. |
| 5,712,658 A | 1/1998 | Arita et al. |
| 5,738,429 A * | 4/1998 | Tagawa et al. ............. 353/122 |
| 5,782,548 A * | 7/1998 | Miyashita .................... 353/42 |
| 5,793,361 A * | 8/1998 | Kahn et al. .................. 345/179 |
| 5,796,386 A | 8/1998 | Lipscomb et al. |
| 5,803,570 A | 9/1998 | Chen et al. |
| 5,859,623 A * | 1/1999 | Meyn et al. .................... 345/1 |
| 5,914,783 A * | 6/1999 | Barrus ......................... 356/375 |
| 5,982,352 A * | 11/1999 | Pryor ......................... 345/156 |
| 6,050,690 A * | 4/2000 | Shaffer et al. .............. 353/122 |
| 6,292,171 B1 * | 9/2001 | Fu et al. ..................... 345/156 |

* cited by examiner

Primary Examiner—Bipin Shalwala
Assistant Examiner—Ricardo Osorio
(74) Attorney, Agent, or Firm—Mark P. Watson

(57) ABSTRACT

An interactive presentation control system, used with a display computer, a computer-controlled image projector, a laser pointer, and a projection screen, comprises a digital camera and a control module. The display computer generates electronic images which are projected onto the projection screen as presentation images. During operation, a presenter uses the laser pointer to trace out a pre-established gesture spatial pattern onto the presentation image. The digital camera acquires these presentation images from which images a processing section in the control module analyzes and identifies the gesture spatial pattern. The identified gesture spatial pattern is compared to a set of pre-established patterns to find a match and to subsequently select a correlated display command. The display command, which can be executed within the control module or transmitted to the display computer, changes the presentation image by an action such as: advancing to the next image, highlighting a text segment, or zooming in on the image.

37 Claims, 5 Drawing Sheets

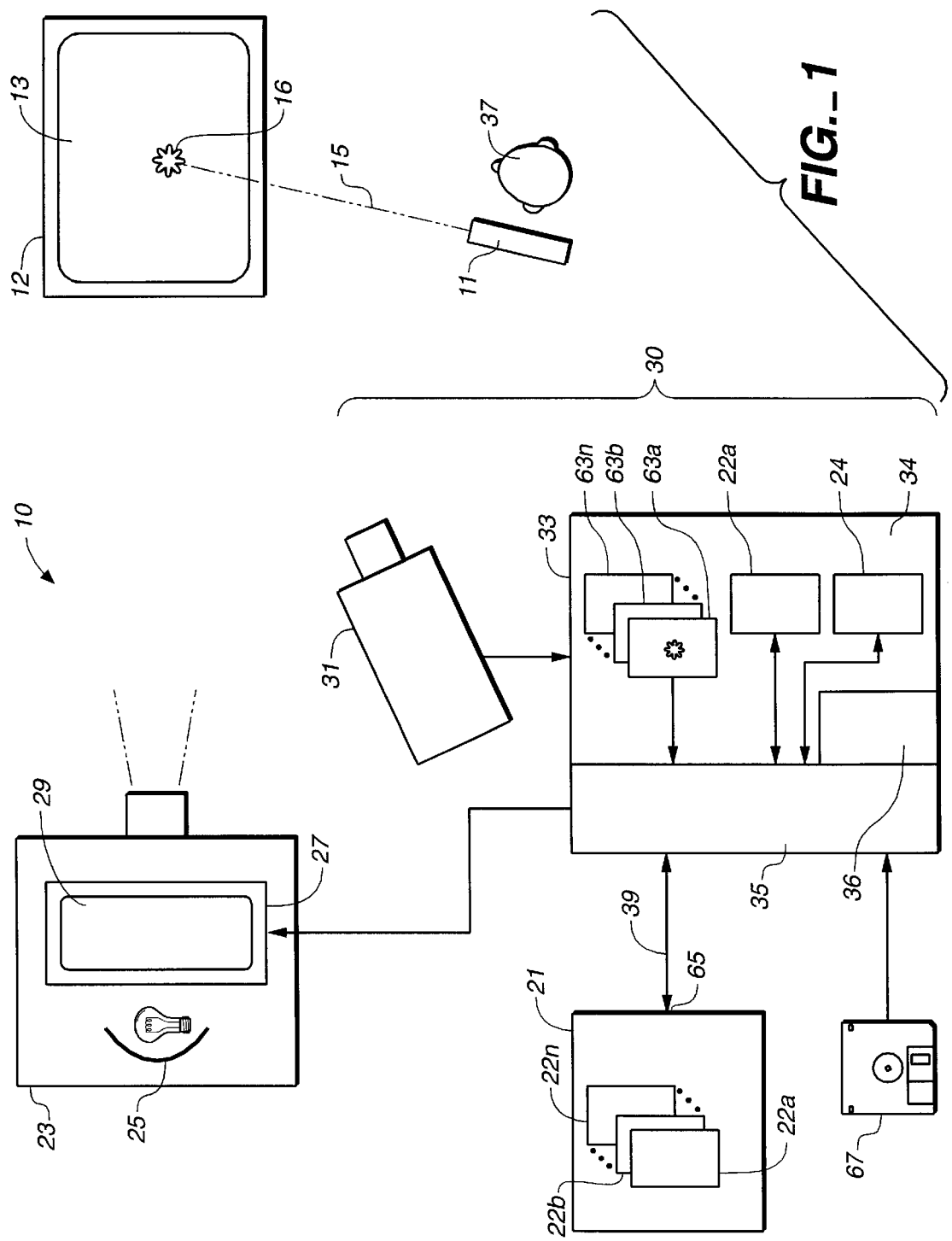
FIG._1

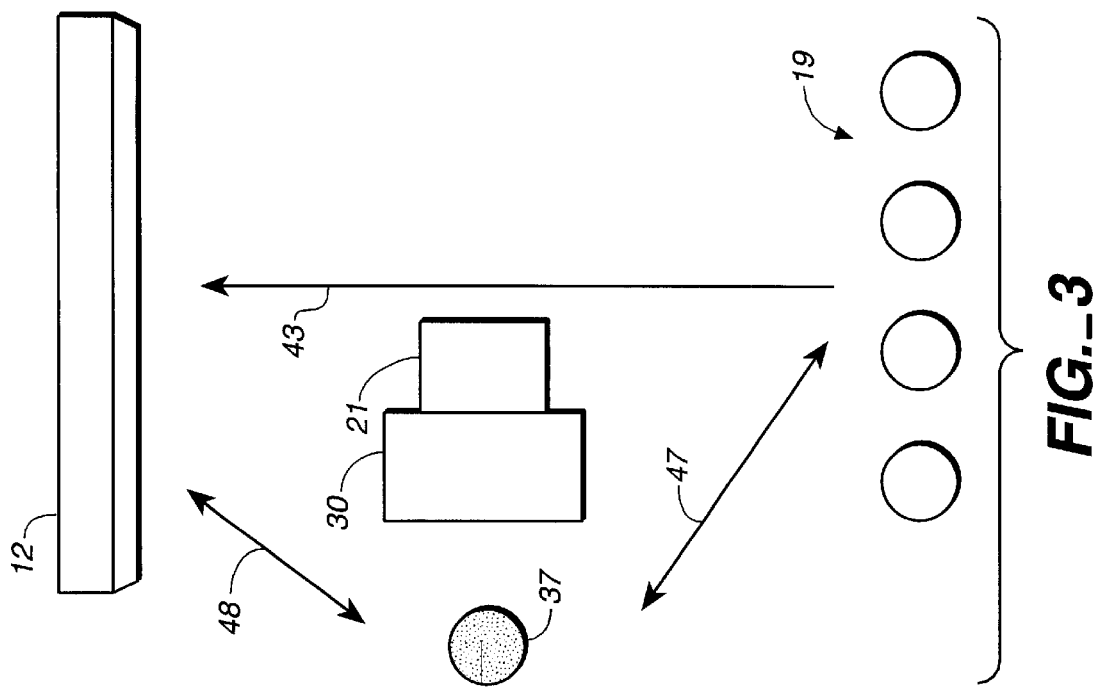
*FIG._3*
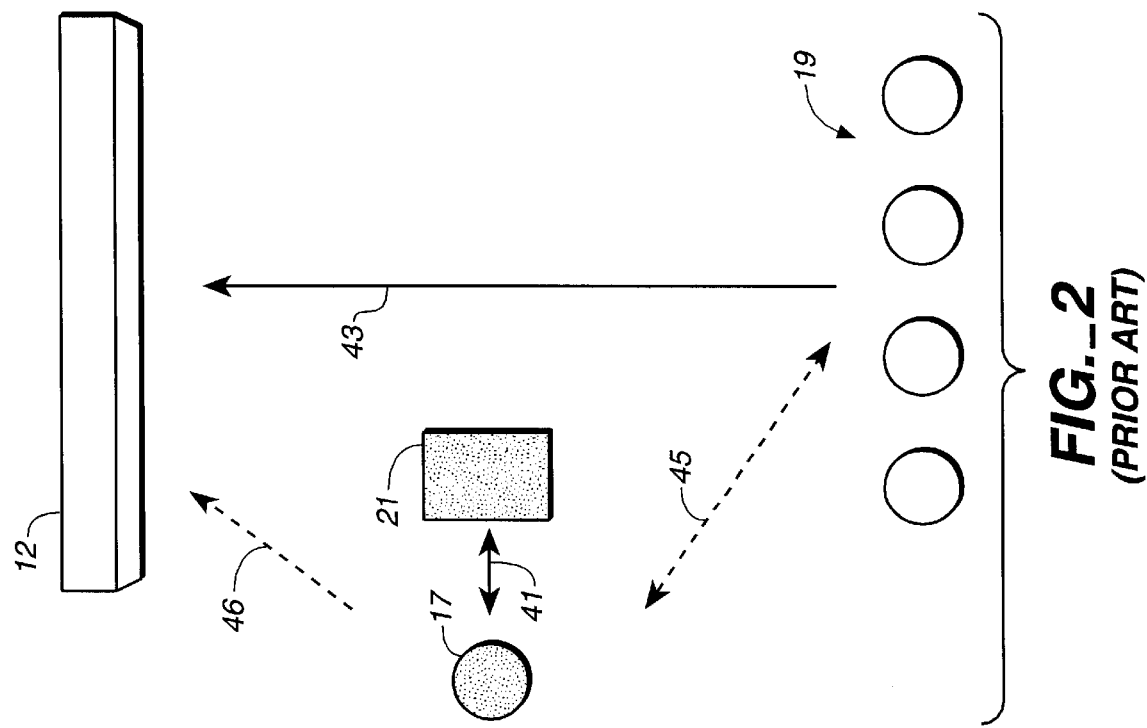
*FIG._2 (PRIOR ART)*

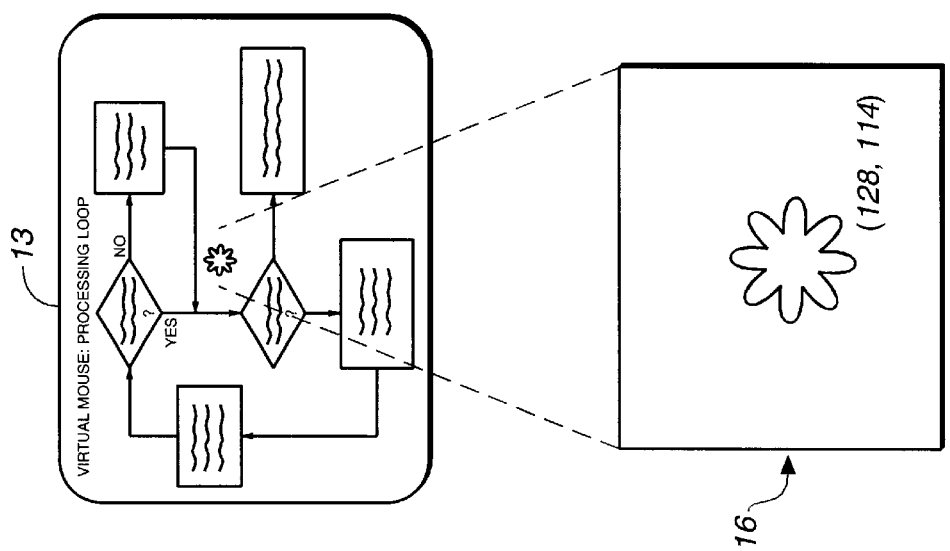
FIG._5
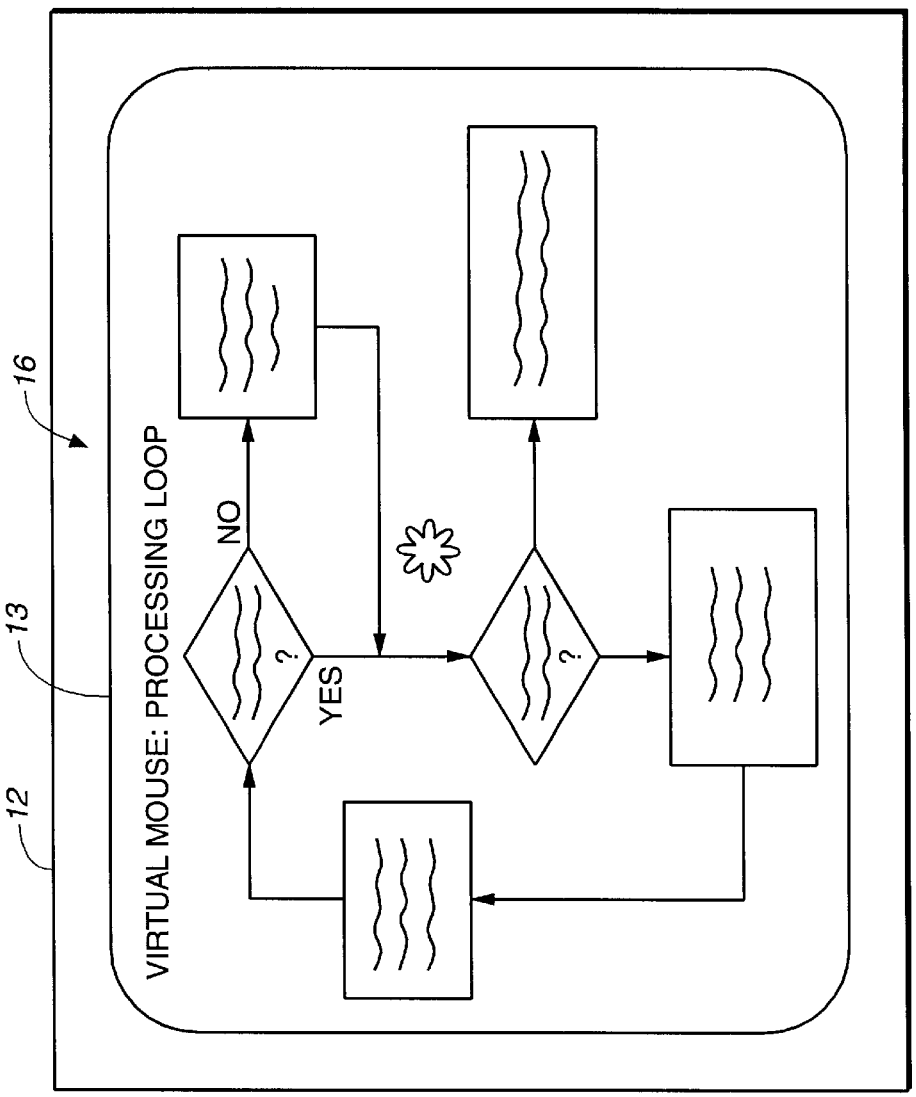
FIG._4

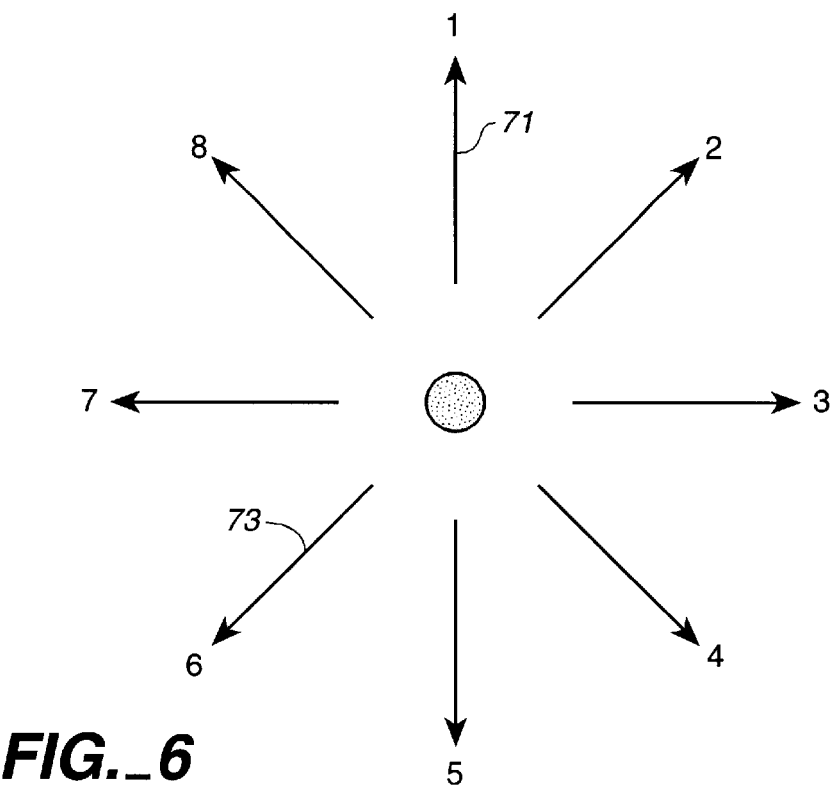
FIG._6
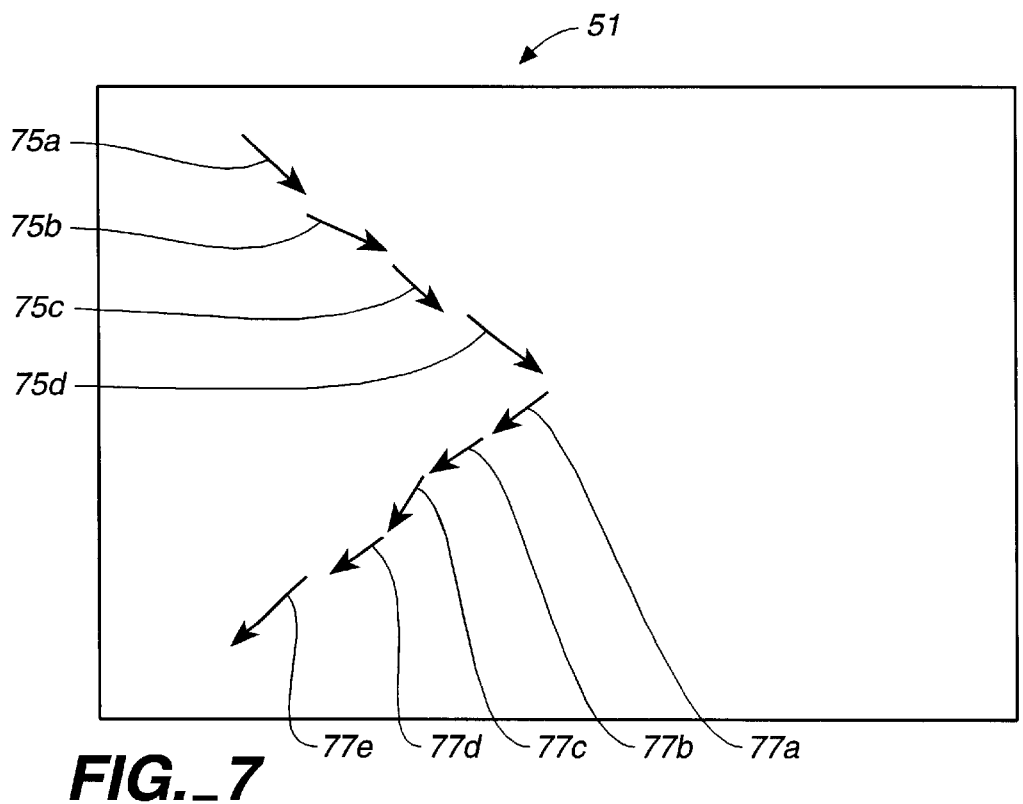
FIG._7

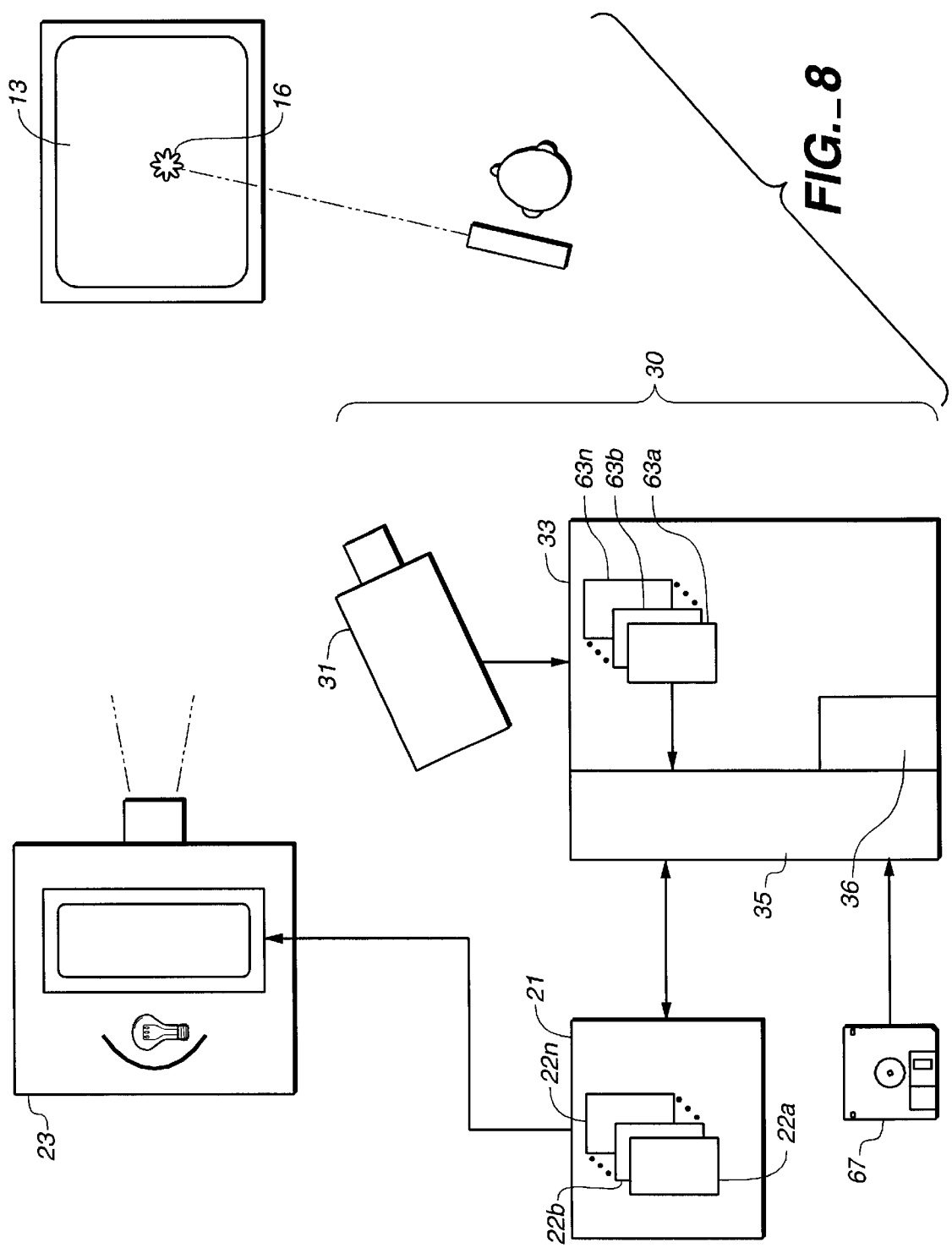
FIG._8

INTERACTIVE DISPLAY PRESENTATION SYSTEM

BACKGROUND OF THE INVENTION

1. Field of the Invention

The present invention is related to presentation systems using a display computer, a computer-controlled image projector, and a projection screen and, more particularly, to an interactive display presentation system in which control is accomplished by moving a laser pointer beam across the projection screen in a pre- established spatial pattern.

2. Description of the Related Art

Charts, text, and various graphical images are commonly presented to an audience in meetings and in classrooms by optically projecting these images onto a projection screen or a wall. An LCD (liquid crystal display) projector is commonly used as the image source, where the charts, text, and graphical images are electronically generated by a display computer, such as a personal computer (PC) or a laptop computer, which typically execute presentation-generating software, such as Microsoft PowerPoint®. In such display systems, the PC provides video outputs such as standard VGA, Super VGA, or XGA. These LCD/PC projection display systems are becoming more popular than the traditional overhead projector and transparencies which they replace.

Whether the operator is standing at a lectern, or is moving about before the audience, he has little direct control over the image being displayed upon the projection screen when using a conventional LCD/PC projection display system. A conventional system requires the operator to return to the display computer, or to have an assistant seated at the computer, so as to provide control for the presentation. At the display computer, either the presenter or the assistant controls the displayed image by means of keystrokes or by "mouse commands" with a cursor in the appropriate area of the computer monitor display screen. The actions of the operator moving to the display computer, or communicating with the assistant, detracts from a natural progression and flow of the presentation. It can be appreciated that the operator develops a closer rapport with the audience the more he is able to interactively control the display presentation or to modify the image appearing on the projection screen without repeatedly redirecting his attention from the screen to an assistant or moving to the display computer.

For example, with the control system disclosed in U.S. Pat. No. 5,782,548, issued to Miyashita, the operator uses a remote control device to wirelessly transmit control signals to a projector sensor. This system requires the operator to turn away from his audience and from the projection screen and to direct his attention to the projector via the remote control device when he wishes to change the presentation image on the screen. Moreover, although the operator acquires some mobility by means of the remote control device, the mobility is limited as he must stay in range of the projector sensor.

It is also known in the art to use a laser pointer projecting a laser spot onto to a region of the presentation image. Such systems typically require multiple steps or actions to be taken in exercising control over the presentation, and this serves to inhibit a natural progression and flow of presentation. In way of example, U.S. Pat. No. 5,682,181, issued to Nguyen et al., discloses a system in which the operator calls up a drop-down menu before a particular function, such as draw mode, page up, etc., can be selected. U.S. Pat. No. 5,502,459, issued to Marshall et al., discloses a method of effecting a mouse double-click in which the user must first activate, then deactivate, then activate again, and again deactivate the laser pointer while maintaining the projected laser spot within an imaginary rectangular area on the presentation image. Other systems require that additional components be used with the conventional LCD/PC projection display systems. U.S. Pat. No. 5,504,501, for example, provides remote control by means of a laser pointer, but requires the use of an optical filter to isolate the laser spot from the surrounding presentation image.

The prior art does not appear to have provided an interactive display presentation system in which the operator is able to control the presentation, such as by providing mouse commands, while retaining a high degree of interaction with the audience. It is therefore an object of the present invention to provide such a presentation system which overcomes these and other limitations of conventional display presentation systems.

It is another object of the present invention to provide such a system in which mouse commands and other presentation functions, such as advancing to a subsequent image, underlining, zooming in, or highlighting, are executed by simply gesturing with a laser pointer. Other objects of the invention will be obvious, in part, and, in part, will become apparent when reading the detailed description to follow.

SUMMARY OF THE INVENTION

The present invention provides an interactive presentation control system in which a presenter controls the presentation by projecting pre-established spatial patterns onto a projection screen by means of a laser spot emitted by a laser pointer. The pre-established spatial patterns are acquired and interpreted by the control system which subsequently issues display commands to a projector. During the presentation, a display computer generates on its local display a bitmap corresponding to the presentation. This bitmap is then transmitted to the LCD projector and the bitmap is then projected onto the screen. The display of the presentation is controlled by the monitoring of the laser spots that are also projected onto the screen. Laser spot control is achieved through a control system. The control system comprises a digital camera which acquires successive images of the laser spot and a control module comprising a processing section which analyzes the positions of the laser spot across the presentation images. When the processing section matches the successive laser spot positions with a pre-established spatial pattern, the corresponding display command is issued. The display command may be transmitted to the display computer which responds by an action such as advancing to the next electronic image, or the display command may perform a function within the control module, such as highlighting text or zooming in on a portion of the presentation image.

BRIEF DESCRIPTION OF THE DRAWINGS

The invention description below refers to the accompanying drawings, of which:

FIG. 1 is a diagrammatical illustration of a first embodiment of an interactive display presentation system comprising a computer-controlled image projector, a projection screen, a laser pointer, and a control system in accordance with the present invention;

FIG. 2 is a diagrammatic plan view of a conventional display presentation system showing an operator interacting primarily with the display computer while an audience follows the presentation images on the projection screen;

FIG. 3 is a diagrammatic plan view of the interactive display presentation system of FIG. 1 with the presenter interacting primarily with the audience and with the presentation images on the projection screen;

FIG. 4 is a diagrammatical illustration of a presentation image on the projection screen of the system of FIG. 1 showing a laser spot, produced by the laser pointer, in the presentation image;

FIG. 5 illustrates how the positional coordinates of the laser spot of FIG. 4 are determined;

FIG. 6 is a diagram of the Freeman chain code convention used in the present invention to describe movement of the laser spot across the presentation image of FIG. 4;

FIG. 7 is a diagrammatical representation of a pre-established spatial pattern projected onto the projection screen by the presenter, the movement of the laser spot described by a series of Freeman chain codes and identified as a right-hand arrowhead; and, FIG. 8 is a diagrammatical illustration of a second embodiment of an interactive display presentation system in accordance with the present invention.

DESCRIPTION OF THE PREFERRED EMBODIMENTS

FIG. 1 shows a first embodiment of an interactive display presentation system 10 comprising a display computer 21, a computer-controlled image projector 23, a projection screen 12, a laser pointer 11, and a presentation control system 30 in accordance with the present invention. Image projector 23 typically comprises an illumination source 25 and an image panel 27 disposed between illumination source 25 and projection screen 12. Presentation control system 30 comprises a digital camera 31, or similar imaging device, and a control module 33. During operation of presentation system 10, display computer 21 generates an initial electronic image 22a from the presentation being run by the presentation-generating software resident in display computer 21. The presentation program comprises a set of electronic images 22a, 22b, . . . , 22k intended for projection during the display presentation. Initial electronic image 22a is transmitted by display computer 21 to control module 33, preferably as a bit-map image, for subsequent transmission to image panel 27 as a projection image 29. Projection image 29 is subsequently projected onto projection screen 12 as a corresponding initial presentation image 13.

A presenter 37 interactively controls presentation system 10 by using laser pointer 11 to project a laser beam 15 impinging on presentation image 13 as a laser spot 16. Laser pointer 11 is preferably a commercially-available device capable of emitting both a continuous and a pulsing radiation beam whose wavelength lies between 630 and 670 nm. Presenter 37 moves laser spot 16 across projection screen 12 to trace out a pre-established gesture spatial pattern and, thus, provide control to display presentation system 10. The gesture spatial pattern, which may comprise a horizontal underscore, an arrowhead, a box enclosing an image portion, or some other pre-assigned geometric shape, is subsequently identified by control module 33, which then selects a corresponding pre-determined display command. The display command may perform a function within control module 33, or may be transmitted to display computer 21, as explained in greater detail below. For example, in one mode of operation, display computer 21 receives the display command and responds by calling up a subsequent slide 22b for transmittal to image projector 23 via control module 33.

The advantages presented by the inventive system can be described with reference to FIGS. 2 and 3. In a conventional presentation, shown in FIG. 2, an operator 17 interacts primarily with display computer 21, or with an assistant seated at display computer 21, to control the presentation on projection screen 12, as indicated by solid arrow 41. Operator 17 thus has limited interaction with the presentation on screen 12, as indicated by dashed arrow 46. In viewing the presentation, the members of an audience 19 direct their attention primarily to the presentation, as represented by solid arrow 43, and to a lesser degree with operator 17, as represented by dashed arrow 45. In comparison, with interactive display presentation system 10, such as disclosed herein, a presenter 37 requires little or no interaction with either display computer 21 or with presentation control system 30, and is thus able to interact both with audience 19, as represented by solid arrow 47, and with the presentation on projection screen 12 via laser pointer 11, as represented by solid arrow 48.

During operation of presentation control system 30 in FIG. 1, digital camera 31 is directed at projection screen 12 so as to continuously sample presentation image 13 currently on view, preferably at a sampling rate of approximately ten frames per second. Control module 33 receives these sampled images as a corresponding succession of acquired images 63a, 63b, . . . , 63n. As can be appreciated by one skilled in the relevant art, acquired images 63a, 63b, . . . , 63n are essentially identical to one another, while presentation image 13 remains on projection screen 12, except for any changes in the position of laser spot 16 between successive acquired images. These successive positions of laser spot 16 are isolated, retained in a memory 34 and analyzed to identify the gesture spatial pattern presenter 37 has projected onto projection screen 12.

Control module 33 comprises a processing section 35 which detects the presence of laser spot 16 within successive acquired images 63a, 63b, . . . , 63n. Because laser spot 16 comprises image elements having a brightness greater than any image elements comprising presentation image 13, processing section 35 is able to locate laser spot 16 by detecting image elements having a brightness exceeding a predetermined threshold, where the threshold is greater than the maximum brightness level present in presentation image. Processing section 35 analyzes presentation image 13 for a contiguous aggregate of such bright image elements, where the aggregate has a height or a width approximating the size of laser spot 16. Preferably, detection of laser spot 16 is performed first in a lower-resolution mode (e.g., where acquired images 63a, 63b, . . . , 63n are viewed as 80×60 pixel images) to find the approximate location of laser spot 16 within presentation image 13. For example, FIG. 4 shows projection screen 12 having laser spot 16 lying within a flow chart comprising presentation image 13. When the approximate location of laser spot 16 has been determined, presentation image 13 is analyzed at a higher resolution of 160× 120 pixels, shown in FIG. 5, and the location of laser spot 16 is determined to a correspondingly greater precision, here at positional coordinates (128, 114).

Processing section 35, in FIG. 1, assigns successive positional coordinates to the location of laser spot 16 for each acquired image 63a, 63b, . . . , 63n in which laser spot 16 is detected. The series of positional coordinates are captured, or stored, in memory 34 and analyzed for the occurrence of a spatial pattern. Control module 33 further comprises a reference section 36 in which are stored a set of pre-established gesture spatial patterns and a set of pre-assigned display commands, each display command assigned, or correlated, to one of the pre-established gesture spatial patterns. When a spatial pattern has been identified, processing section 35 compares the identified spatial pattern with the set of pre-established gesture spatial patterns. If a match is found, processing section 35 selects the display command assigned to the matching pre-established gesture spatial pattern and executes the selected display command.

When transmitted to display computer 21, the selected display command is received via an input port 65. In a preferred embodiment, input port 65 comprises a serial port, the display command being transmitted via a serial or a USB cable 39. As can be appreciated by one skilled in the relevant art, processing section 35 may reside in control module 33 as shown or, alternatively, may be resident in either digital camera 31 or display computer 21, may be retrieved as computer-readable instructions from a storage medium 67, or may be distributed among any of digital camera 31, control module 33, and display computer 21.

When a laser spot 16 is detected within each acquired image 63a, 63b, . . . . , 63n, processing section 35 assigns positional coordinates (e.g., $x_i$, $y_i$) to the successive positions of laser spot 16 motion to determine whether laser spot 16 is moving, and, if moving, whether the movement is random or whether the movement correlates to one of a number of pre-established shapes or patterns. Movement and direction can be determined by analyzing the corresponding sequence of displacement vectors, $\vec{r}_i((x_{i+1}-x_i),(y_{i+1}-y_i))$ Preferably, a spatial pattern recognition tool, known in the relevant art as a Freeman chain code, is used to determine movement of laser spot 16 and detect the formation of an arrowhead, a box, or other geometric feature. A Freeman chain code assigns a number to the translational vector of laser spot 16, that is, to a vector describing movement from one acquired image 63$_i$ to next acquired image 63$_{i+1}$. As shown in FIG. 6, a vertical movement, represented by a directional vector 71 at $$\frac{\pi}{2},$$

is assigned a "code 1," while a diagonal movement in the third quadrant, represented by a directional vector 73 at $$\frac{5\pi}{4},$$

is assigned a "code 6," and so on. Processing section 35 discriminates between random movement of laser spot 16 and an intentional gesture made by presenter 37 by analyzing the resulting sequence of Freeman chain codes.

In way of an example, FIG. 7 illustrates how a captured gesture spatial pattern is described by a Freeman chain code. Control module 33 has captured the positional coordinates of laser spot 16 in five initial consecutive images in which the motion of laser spot in four successive image pairs is described by a series of four "code 4s" represented by directional vectors 75a, 75b, 75c, and 75d. The motion of laser spot 16 in five subsequent images (i.e., acquired images 63f to 63j, not shown) is described by a series of five "code 6s" represented by directional vectors 77a, 77b, 77c, 77d, and 77e respectively.

Processing section 35 compares the captured gesture spatial pattern sequence of four consecutive "code 4" vectors followed by a series of five consecutive "code 6" vectors with pre-established gesture spatial pattern entries provided to processing section 35 from reference section 36, which may be a random-access memory, firmware, or a look-up table. A match determines that the captured gesture comprises a right-hand arrow 51. For a captured gesture spatial pattern comprising a random series of different Freeman chain codes, processing section 35 would determine that random laser spot movement is occurring and no display command would be issued.

Display presentation system 10 can be used in a "mouse mode" to project a series of PowerPoint® slides as presentation images 13. By way of example, if presenter 37 traces out a gesture spatial pattern comprising right-hand arrowhead 51, display computer may respond by calling up the next in the series of presentation slides for transmittal to image projector 23. That is, the display command of "Advance to next slide" would be correlated, or assigned, to right-hand arrow 51. In the same manner, if the gesture spatial pattern comprises a left-hand arrowhead, the previous image may be recalled and provided as projection image 29. Alternatively, an arrowhead indicator can be assigned to change the volume of the audio, or change some other slide characteristic of the presentation via a pre-established display command.

Presenter 37 may also position laser spot 16 in a particular region of presentation image 13, such as on an icon or over a menu entry. Processing section interprets this condition as a selection of the surrounding icon or menu entry, equivalent to a first mouse click. A second mouse click, subsequent to the action of selection, is effected by pulsing laser pointer 11 for a pre-established time interval, preferably three seconds, while laser spot 16 remains in the icon or menu entry. Alternatively, positioning laser spot 16 in the border of presentation image 13 produces a drop-down menu for subsequent selection and action. A subsequent single pulsing of laser spot 16 on the selected region is subsequently interpreted by processing section 35 as a second mouse click.

In this manner, the projection of laser beam 15 onto presentation image 13 serves to control the display presentation, by opening a new file, cutting, or pasting, for example, from essentially any location in the presentation room. Thus, laser pointer 11 is used with presentation control system 30 much in the same way as a mouse, a keyboard, or other peripheral device would be used to control projection image 29 via direct input to display computer 21. This method of control is especially useful in presentations where presenter 37 needs to access and navigate Internet web links while speaking and moving about.

Alternatively, a "drawing mode" can be accessed when laser pointer 11 is pulsed to produce three consecutive mouse clicks. In the drawing mode, laser spot 16 can be used to draw lines or curves on presentation image 13. To exit from the drawing mode, laser pointer 11 is pulsed to produce four mouse clicks. By drawing curves, additional functions can be executed during the presentation. In a preferred embodiment, when presenter 37 traces out a horizontal line in the text or graphics portion of presentation image 13, for example, processing section 35 generates a subsequent electronic image 24 by combining initial electronic image 22a with an overlay, where the overlay provides a highlighting or underlining corresponding to the horizontal line traced out by laser spot 16.

Subsequent electronic image 24 is then transmitted to projector 23 for projection as presentation image 13 having the corresponding text portion or graphic portion underscored or highlighted. Additionally, when presenter 37 traces out a rectangular shape enclosing a portion of presentation image 13, the corresponding portion of initial slide 22 is enlarged and transmitted as subsequent electronic image 24, so as to result in a zoom-in operation.

In an alternative embodiment, shown in FIG. 8, image projector 23 is directly connected to display computer 21. This configuration can be used when control system 30 provides only mouse commands to display computer 21. Operation is similar to the embodiment described above, with laser spot 16 projected onto presentation image 13 to provide control. Digital camera 31 samples presentation image 13 and acquired images 63a, 63b, . . . , 63n are analyzed by processing section 35 in control module 33. When a match is found between an identified gesture spatial pattern and a pre-established gesture spatial pattern from reference section 36, a corresponding mouse command is transmitted to display computer 21 via serial cable 39. As in the previous embodiment, processing section 35 instructions and reference section 36 data may be retrieved from storage medium 67.

Prior to operation of display presentation system 10, control system 30 may be calibrated by using processing section 35 to correlate the image elements and positional coordinates of presentation image 13 to the corresponding elements and coordinates comprising initial electronic image 22a resident in display computer 21. This may be done, for example, by, i) generating an embedded predetermined pattern (not shown) in projection image 29, ii) acquiring presentation image 13, including the embedded pattern, by means of electronic camera 31, iii) detecting the predetermined pattern and establishing relevant positional coordinates within the image acquired by electronic camera 31, and iv) analyzing the pattern coordinates to mathematically correlate the coordinates of presentation image 13 to the coordinates of initial electronic image 22a. Such a calibration process is described in commonly-assigned, co-pending patent application entitled, "Method and apparatus for calibrating a computer-generated projected image," filed on Mar. 31, 1999, and assigned Ser. No. 09/283,093 and incorporated herein by reference in its entirety.

Processing section 35 may additionally function to determine the ambient light level in the presentation area, as sensed by electronic camera 31, so as to provide for an optimal setting of the brightness and contrast of presentation image 13. The color balance of presentation image 13 is optimized with image projector 23 projecting a standardized color calibration chart (not shown) onto projection screen 12, and comparing the values of the projected colors, as acquired by electronic camera 31, with the known values for the chart colors. From the comparison results, processing section 35 determines the color corrections to be made and adjusts presentation image 13 accordingly.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A display presentation control system suitable for use in providing control to a projection display apparatus including a display computer for generating initial and successive electronic images, a computer-controlled image projector, a projection screen, and a laser pointer operating in pulsing and continuous-radiation modes, the projector for receiving the initial electronic image for projection onto the projection screen as an initial presentation image, and the laser pointer for providing the control when used by a presenter to emit a laser spot onto the projection screen and project a spatial pattern on the initial presentation image, said control system comprising:

an electronic camera directed at the initial presentation image and producing a sequence of acquired images thereof, each said acquired image comprising image elements; and, a control module responsive to said acquired images, said control module comprising:

means for locating the laser spot in said acquired images;

means for assigning positional coordinates to each said located laser spot so as to produce a sequence of positional coordinates $(x_i, y_i)$ corresponding to sequential positions of the laser spot in the initial presentation image;

means for analyzing said sequence of positional coordinates so as to capture a gesture spatial pattern formed by said sequence of positional coordinates;

means for matching said captured gesture spatial pattern to one of a set of pre-established gesture spatial patterns;

means for selecting a display command, said selected display command correlated to said matched pre-established gesture spatial pattern; and means for generating a subsequent electronic image in response to said selected display command, said subsequent electronic image transmitted to the image projector for projection onto the projection screen as a subsequent presentation image.

2. The control system of claim 1 wherein said means for locating the laser spot comprises means for identifying a bright image element, said bright image element comprising an acquired image element having a brightness exceeding a predetermined threshold value.

3. The control system of claim 2 wherein said means for locating the laser spot further comprises means for identifying a cluster of said bright image elements, said cluster comprising a contiguous image element aggregate having a linear dimension exceeding a predetermined value.

4. The control system of claim 1 wherein said means for assigning positional coordinates comprises means for analyzing said acquired image in a decreased-resolution mode.

5. The control system of claim 1 wherein said means for analyzing positional coordinates comprises means for deriving a sequence of displacement vectors $\vec{r}_i((x_{i+1}-x_i), (y_{i+1}-y_i))$, each said displacement vector corresponding to the difference in successive said positional coordinates.

6. The control system of claim 5 wherein said means for analyzing positional coordinates comprises means for describing said sequence of displacement vectors by a sequence of Freeman chain codes.

7. The control system of claim 1 further comprising means for detecting a laser spot pulse, said laser spot pulse produced by operating the laser pointer in its pulsing mode for a pre-established time interval.

8. The control system of claim 7 wherein said pre-established time interval is approximately three seconds.

9. The control system of claim 7 wherein said display command comprises a first mouse click when an essentially stationary laser spot is detected in a pre-defined region of the initial presentation image by said means for analyzing positional coordinates, said first mouse click transmitted to the display computer.

10. The control system of claim 9 wherein said pre-defined region comprises an icon.

11. The control system of claim 9 wherein said first mouse click provides a drop-down menu in said subsequent presentation image.

12. The control system of claim 9 wherein said display command further comprises a second mouse click when said laser spot pulse is detected, said second mouse click transmitted to the display computer.

13. The control system of claim 12 wherein said second mouse click initiates a selection of said pre-defined region of the initial presentation image in said subsequent presentation image.

14. The control system of claim 7 wherein said selected display command comprises an overlay command correlated to the receipt of three said laser spot pulses, said overlay command producing a subsequent electronic image comprising an overlay image superimposed on the initial electronic image.

15. The control system of claim 14 wherein said overlay image comprises one or more curves corresponding to translational movements of the laser spot across the initial presentation image.

16. The control system of claim 14 wherein said overlay image comprises a highlighting region, said highlighting region corresponding to translational movements of the laser spot across the initial presentation images.

17. The control system of claim 15 wherein said selected display command comprises a zoom-in command when said one or more curves define an enclosed portion of the initial presentation image, said zoom-in command producing a subsequent electronic image comprising an enlarged portion of the initial electronic image, said enlarged portion corresponding to said enclosed portion of the initial presentation image.

18. The control system of claim 1 wherein said means for generating a subsequent electronic image comprises means for transmitting a mouse command to the display computer, said subsequent electronic image transmitted to the image projector by the display computer.

19. The control system of claim 18 wherein said mouse command comprises a command for advancing to the next successive electronic image when said matched pre-established gesture spatial pattern comprises a right-hand arrowhead.

20. The control system of claim 1 further comprising memory means for storing said positional coordinates.

21. The control system of claim 20 wherein said memory means comprises a reference section for storing said display commands and said pre-established images.

22. A display presentation control system suitable for use in providing control to a projection display apparatus including a display computer for generating initial and successive electronic images, a computer-controlled image projector, a projection screen, and a laser pointer operating in pulsing and continuous-radiation modes, the projector for receiving the initial electronic image for projection onto the projection screen as an initial presentation image, and the laser pointer for providing the control when used by a presenter to emit a laser spot onto the projection screen and project a spatial pattern on the initial presentation image, said control system comprising:

an electronic camera directed at the initial presentation image and producing a sequence of acquired images thereof, each said acquired image comprising image elements; and, a control module responsive to said acquired images, said control module comprising:

a memory section comprising a set of pre-established gesture spatial patterns and a set of display commands, each said display command corresponding to one of said pre-established gesture spatial patterns;

locating circuitry for locating the laser spot in said acquired images;

image processing circuitry responsive to the locating of the laser spot in said acquired images, said image processing circuitry for assigning positional coordinates to each said located laser spot, for producing a sequence of positional coordinates $(x_i, y_i)$ corresponding to sequential positions of the laser spot in the initial presentation image, and for analyzing said sequence of positional coordinates so as to capture a gesture spatial pattern formed by said sequence of positional coordinates; and command circuitry responsive to said captured gesture spatial pattern for matching said captured gesture spatial pattern to one of said pre-established gesture spatial patterns, for selecting one of said display commands corresponding to said matched gesture spatial pattern; and for generating a mouse command in response to said selected display command;

said mouse command transmitted to the display computer such that a subsequent presentation image is projected onto the projection screen.

23. The control system of claim 22 wherein said locating circuitry comprises brightness detection circuitry for identifying a bright image element, said bright image element comprising an acquired image element having a brightness exceeding a predetermined threshold value.

24. The control system of claim 23 wherein said locating circuitry further comprises cluster detection circuitry for identifying a cluster of said bright image elements, said cluster comprising a contiguous image element aggregate having a linear dimension exceeding a predetermined value.

25. The control system of claim 23 wherein said image processing circuitry comprises computational circuitry for deriving a sequence of displacement vectors $\vec{r}_i((x_{i+1}-x_i), (y_{i+1}-y_i))$, each said displacement vector corresponding to the difference in successive said positional coordinates.

26. The control system of claim 25 wherein said computational circuitry further comprises conversion circuitry for converting said sequence of displacement vectors into a sequence of Freeman chain codes.

27. A method for controlling a display presentation apparatus comprising a computer-controlled image projector projecting a sequence of presentation images onto a projection screen, control effected by means of a presenter using a laser pointer to project a laser spot onto the projection screen, the laser spot moved across the presentation image in a pre-established gesture spatial pattern, said method comprising the steps of:

acquiring a series of images corresponding to the projected presentation image and laser spot, each said acquired image comprising a plurality of image elements;

assigning a series of positional coordinates to the location of the laser spot within each acquired image;

analyzing said series of positional coordinates so as to identify the gesture spatial pattern produced by the laser spot; and, generating a presentation command in accordance with said identification of the gesture spatial pattern.

28. The method of claim 27 further comprising the step of matching said identified gesture spatial pattern to the pre-established gesture spatial pattern.

29. The method of claim 27 wherein said step of analyzing said positional coordinates comprises the step of detecting bright acquired image elements, each said bright acquired image element having a brightness exceeding a predetermined threshold value.

30. The method of claim 29 further comprising the step of identifying a cluster of bright acquired image elements as the laser spot, said cluster comprising a contiguous acquired image element aggregate having a linear dimension exceeding a predetermined value.

31. The method of claim 29 further comprising the step of detecting an essentially stationary laser spot.

32. The method of claim 29 further comprising the step of selecting a portion of said initial slide in response to said detection of an essentially stationary laser spot.

33. The method of claim 31 further comprising the step of detecting a pulsing laser spot.

34. The method of claim 33 further comprising the step of providing a drawn curve in said subsequent presentation image in response to the detection of said pulsing laser spot, said drawn curve corresponding to the movement of said laser spot.

35. The method of claim 34 further comprising the step of highlighting a portion of said subsequent presentation image, said highlighted portion corresponding to said drawn curve.

36. The method of claim 27 wherein said step of analyzing comprises the step of describing said identified gesture spatial pattern by means of a Freeman chain code.

37. The method of claim 36 wherein said step of generating comprises the step of producing a sequential presentation image when said identified gesture spatial pattern comprises an arrowhead shape.

* * * * *

UNITED STATES PATENT AND TRADEMARK OFFICE
CERTIFICATE OF CORRECTION

PATENT NO.   : 6,346,933 B1                                          Page 1 of 1
DATED        : February 12, 2002
INVENTOR(S)  : Shang-Hung Lin It is certified that error appears in the above-identified patent and that said Letters Patent is hereby corrected as shown below:

<u>Column 9,</u>
Line 19, change "images" to -- image --.

Signed and Sealed this

Third Day of September, 2002

Attest:

Attesting Officer

JAMES E. ROGAN
*Director of the United States Patent and Trademark Office*